Aug. 25, 1931.  A. B. CADMAN  1,820,650
VEHICLE BRAKE
Filed Oct. 3, 1927  2 Sheets-Sheet 2

Inventor:—
Addi B. Cadman,
By Churchill, Parker & Carlson
Attys

Patented Aug. 25, 1931

1,820,650

UNITED STATES PATENT OFFICE

ADDI BENJAMIN CADMAN, OF BELOIT, WISCONSIN, ASSIGNOR, BY MESNE ASSIGNMENTS, TO WARNER ELECTRIC BRAKE CORPORATION, OF SOUTH BELOIT, ILLINOIS, A CORPORATION OF ILLINOIS

VEHICLE BRAKE

Application filed October 3, 1927. Serial No. 223,497.

This invention relates to improvements in vehicle brakes and more particularly to brakes of the class wherein the braking force is derived from the kinetic energy of the vehicle or from the power unit thereof.

One object of the invention is to provide a new and improved mechanism by which a braking force derived from a common power unit operated by the propeller shaft of an automotive vehicle is applied to effect a powerful braking action at the brakes on a plurality of vehicle wheels.

A more detailed object is to provide, in combination with a pair of brakes for the rear wheels of a vehicle, an electromagnetic friction clutch driven from the propeller shaft of the vehicle at a point adjacent the differential housing and operable through novel torque multiplying connections to apply a powerful actuating force to each of said brakes.

Still another object is to provide, in combination with the rear wheel brakes of an automotive vehicle, a novel power unit by which a mechanical couple of forces resulting from the rotation of the propeller shaft of the vehicle in either direction are applied individually to said brakes.

Other objects and advantages of the invention will become apparent from the following detailed description taken in connection with the accompanying drawings, in which.

Figure 2:
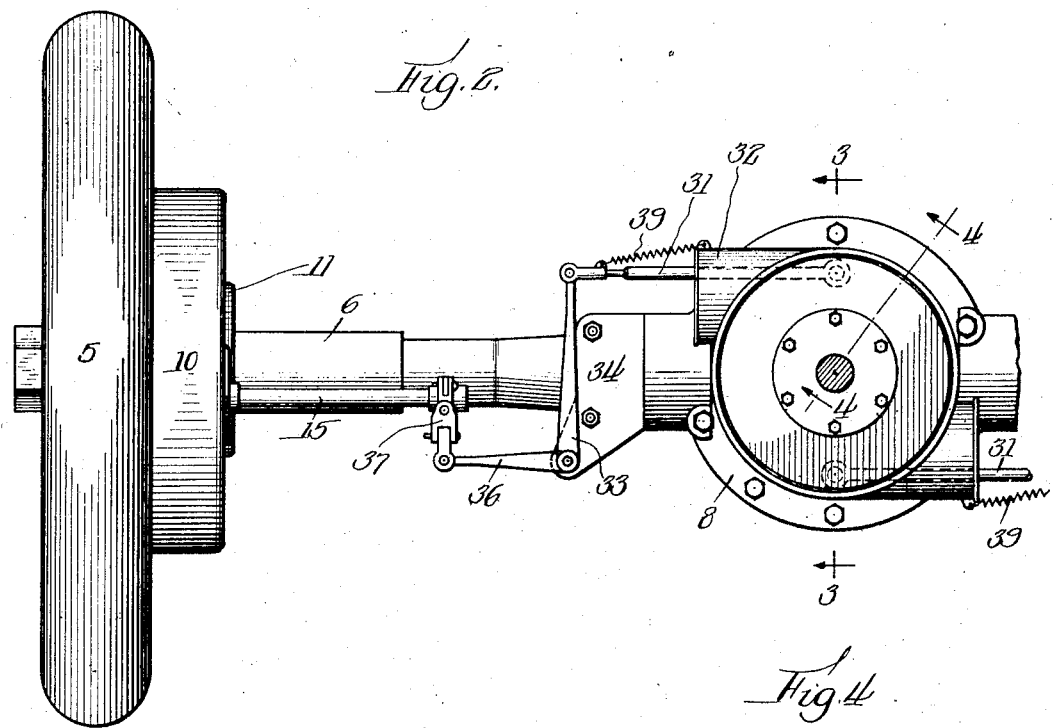
Fig. 2 is a fragmentary front elevational view of the structure shown in Fig. 1.
Figures 3, 4:
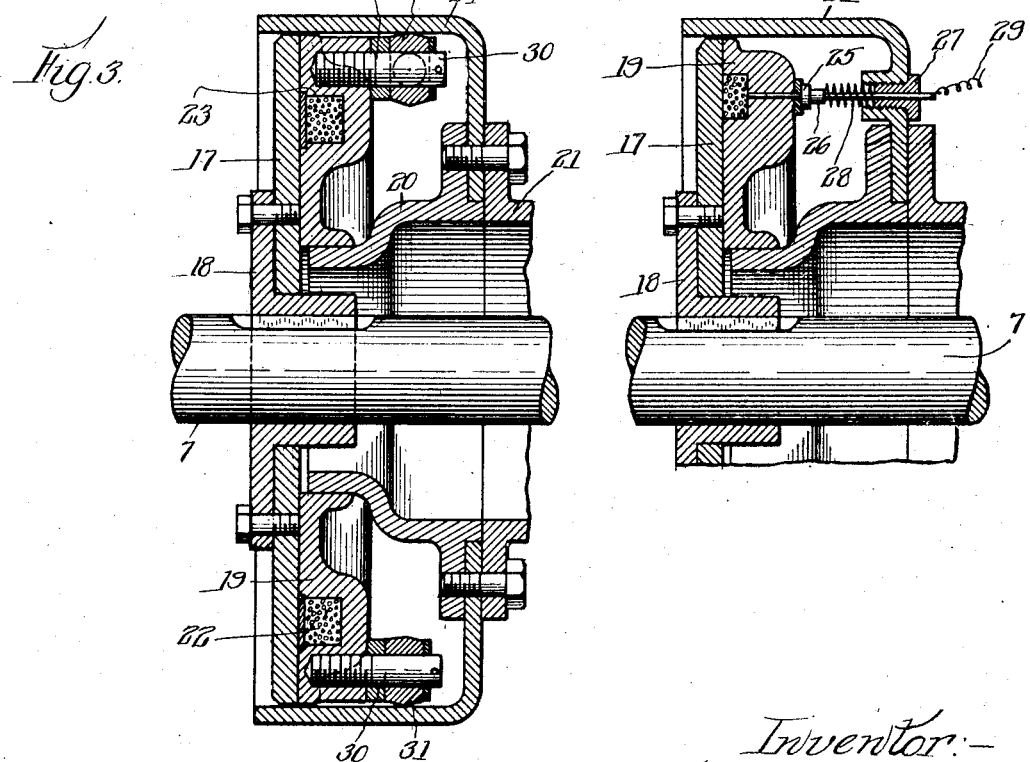

Figs. 3 and 4 are sectional views taken respectively along the lines 3—3 and 4—4 of Fig. 2.

While the invention is susceptible of various modifications and alternative constructions, I have shown and herein described in detail the preferred embodiment but it is to be understood that I do not thereby intend to limit the invention to the specific form disclosed but intend to cover all modifications and alternative constructions falling within the spirit and scope of the invention as expressed in the appended claims.

In the exemplary embodiment of the invention illustrated in the drawings, the numeral 5 represents the rear wheels of an automotive vehicle mounted at opposite ends of a rear axle housing 6 and driven by a propeller shaft 7 which projects forwardly from the differential housing 8.

Each wheel is equipped with a brake 9, the ones shown herein being of the internal shoe type, and each comprising a drum 10 secured on the inner side of the wheel and a pair of segmental shoes (not shown) nonrotatably mounted within the drum on a stationary casing 11. This casing is rigid with one end of the axle housing 6 and supports one or more cam blocks 12 for expanding the shoes into braking engagement with the internal surface of the drum. Preferably each cam is rectangular in shape and disposed between the adjacent ends of the brake shoes so as to be adapted to expand the shoes upon oscillation in either direction.

Where two cams are provided on each brake as, in the present embodiment, one may be operated by hand from the driver's seat of the vehicle and used as a parking brake. To this end, the shaft for one of the expanding cams may be provided with a crank 13 and arranged to be oscillated forwardly by a tension rod 14. In the present instance, the foremost cam 12 of each brake is mounted on the end of a rock shaft 15 whose inner end is supported by a forwardly extending bracket 16 on the housing 6. These rock shafts are arranged to be actuated simultaneously to set both of the brakes by a common power unit now to be described.

The power unit comprises generally a friction clutch controlled electromagnetically by the driver of the vehicle and having interengageable driving and driven elements mounted respectively on the propeller shaft 7 and the differential housing 8 with the driven element connected by separate torque multiplying devices to the rock shafts 15. In the present instance, the driving element of the friction clutch is located just ahead of the differential housing and includes a flat disk 17 (Fig. 3) secured to a flange on a fitting 18 which may be keyed or otherwise secured to the shaft 7 so as to rotate therewith. This disk constitutes the armature of an electromagnet whose core 19 is the driven element of the clutch. The core comprises a rigid annular ring of magnetic material mounted for oscillation on the reduced forward end of a tubular member 20 whose opposite flanged end is bolted to a flange on a tubular extension 21 of the differential housing. Thus the ring 19 is adapted for a slight axial movement to bring the opposed flat surfaces of the two clutch elements into firm frictional engagement.

Operation of the clutch may be controlled by energization and deenergization of an annular coil 22 comprising a plurality of turns of wire contained in a groove 23 which is formed in the outer portion of the ring 19 so as to divide the friction surface thereof into inner and outer portions which constitute the two poles of the annular magnet. A casing 24 clamped between the member 20 and the extension 21 and having a flange projecting over the clutch elements serves to exclude dust and dirt from the friction surfaces.

Energization of the magnet coil may be effected by any preferred means such as a storage battery under the control of a suitable rheostat which may be operated by the driver of the vehicle. One terminal of the magnet coil may be grounded through the core 19, the member 20 and the vehicle frame, while the other terminal is connected to an insulated contact strip 25 (Fig. 4). To allow for oscillation of the ring 19, this strip is made arcuate in form and is continuously engaged by a brush 26 slidably supported in an insulating bushing 27. A compression spring 28 serves to press the brush against the strip 25 and at the same time holds a portion of the ring 19 in yielding contact with the disk 17. Such contact between the magnet core and its armature provides an initial path for the flow of magnetic flux through the armature. A wire 29 is provided to connect the brush to the other side of the energizing circuit.

Figure 1:
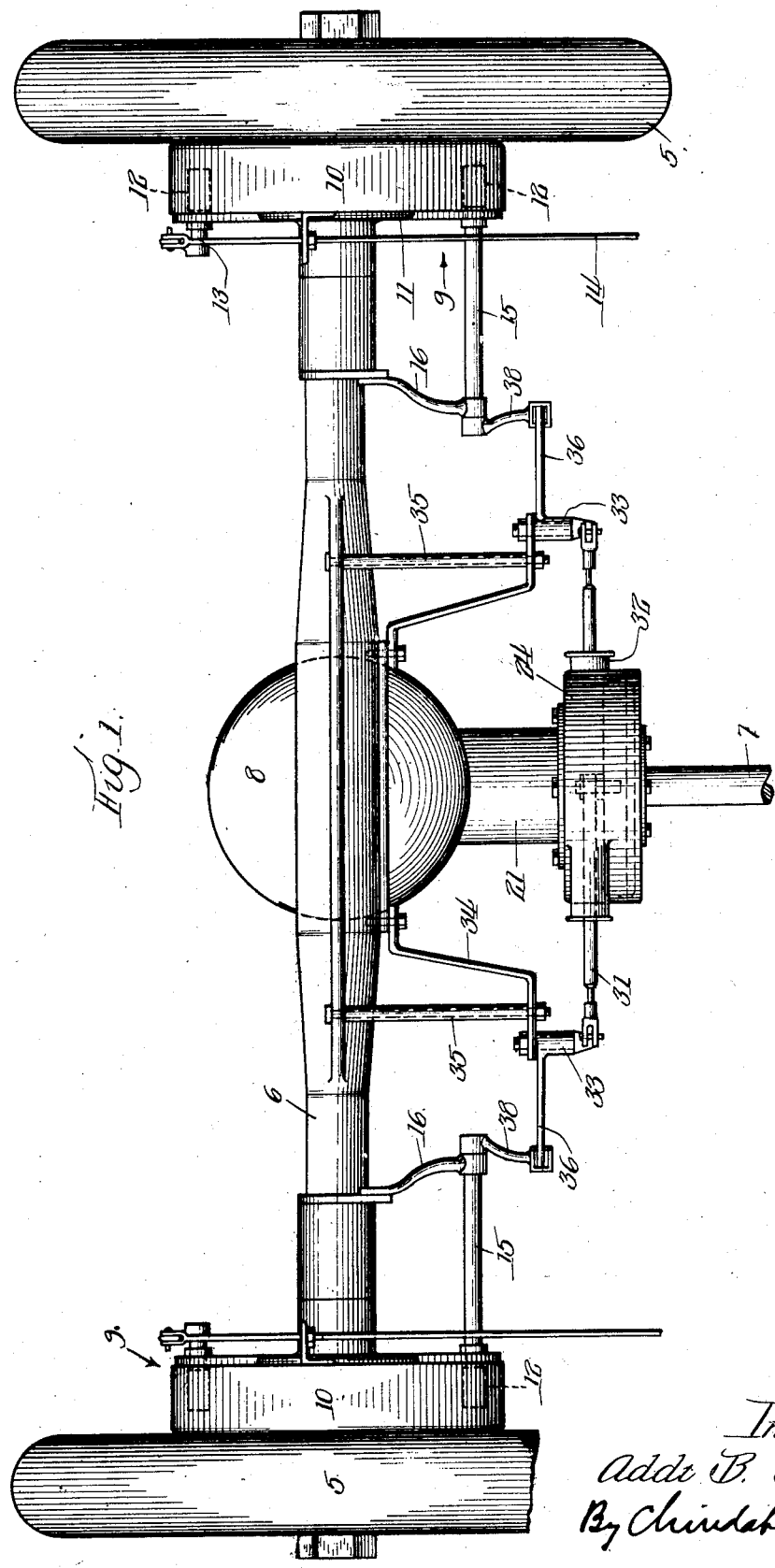
Figure 1 is a fragmentary plan view of the rear wheels and rear axle assembly of an automotive vehicle equipped with a brake mechanism embodying the features of the present invention.

Frictional forces derived from the oscillation of the driven clutch element when the magnet is energized are applied as a mechanical couple of forces to the rock shafts 15 through the medium of two powerful torque multiplying connections. To this end, the ring 19 is provided at its top and bottom portions with rearwardly extending studs 30 pivotally connected to the ends of the two rigid rods 31 which extend outwardly in parallel relation through elongated slots in laterally extending portions 32 of the casing 24. At the outer end, each rod 31 is connected to the long arm of a bell crank 33 pivoted on a bracket 34 which may be bolted to the differential housing and rigidly braced by rods 35 (Fig. 1). Thus the bell crank 33 shown in Fig. 2, is fulcrumed below the axle because it is associated with the upper rod 31. In the case of the bell crank on the opposite side of the propeller shaft, the fulcrum point would be disposed above the level of the axle and the arm of the bell crank connected to the lower rod 31 would project downwardly. Each bell crank has an outwardly projecting arm 36 which is normally disposed in horizontal position and connected by a linkage 37 to the free end of a crank arm 38 fast upon the innermost end of the corresponding rock shaft 15. A suitable means such as a pair of springs 39 may be employed for returning the clutch parts and the torque connections to brake releasing position after deenergization of the magnet.

Assuming that the vehicle is moving in the direction corresponding to the clockwise motion of the propeller shaft 7 (Fig. 2), the operation of the parts will now be described. When the magnet is energized, the flux produced across the magnetic poles flows initially through the engaged portions of the clutch elements whereupon the elements are drawn into firm frictional engagement. The ring 19, being thus attached to the disk 17 and free to move in either direction, oscillates with the disk and in such motion places the rods 31 under tension. This inward pull on the rods oscillates both of the bell cranks 33 and hence the expanding cams for both of the brakes. When the brakes are set to such an extent that reactions of the drums on the brake shoes overcome the frictional force tending to hold the clutch elements attached, the driven element 19 will slip relative to the driving element 17 at the same time holding the brakes set until the magnet is deenergized. The same operation takes place when the magnet is energized with the vehicle moving in the opposite direction except that the rods 31 would then be placed under compression and therefore would oscillate the bell cranks in the reverse direction.

It will be apparent that the brake operating mechanism thus provided is simple and inexpensive in construction and powerful in its operation. A single power unit is employed for actuating both of the rear wheel brakes and all of the parts are compactly arranged on the vehicle in an out-of-the-way location. With the efficient type of magnet and the powerful torque multiplying connections employed, the required force for setting the brakes may be produced mounted on said housing for oscillation about said shaft, electromagnetic means operable to cause frictional engagement between said elements, and two mechanical connecting means one between said driven and each of said brake actuating means.

8. A power brake having, in combination with the rear wheels, the propeller shaft and the rear axle housing of an automotive vehicle, a pair of brakes, one on each of said wheels, actuating means for each brake, a driving clutch element mounted on said shaft in front of and adjacent the differential housing, a driven element mounted for oscillation about said shaft, electromagnetic means operable to cause frictional engagement between said elements, and two mechanical connecting means one between said driven and each of said brake actuating means, each of said connecting means including a rigid rod reciprocable in a plane perpendicular to said propeller shaft.

9. A power brake having, in combination with the rear wheels, the propeller shaft and the rear axle housing of an automotive vehicle, a pair of brakes, one on each of said wheels, actuating means for each brake, a driving clutch element mounted on said shaft in front of and adjacent the differential housing, a driven element mounted for oscillation about said shaft, electromagnetic means operable to cause frictional engagement between said elements, and two mechanical connecting means one between said driven and each of said brake actuating means, each of said connecting means including a rigid rod and a bell crank movable transversely of said propeller shaft.

10. A power brake having, in combination with the rear wheels and the propeller shaft of an automotive vehicle, brakes for said wheels, a friction element mounted for oscillation about the axis of said shaft, a driving friction element rotatable with said shaft, means operable to cause gripping engagement of said elements, a connection between said oscillatory element and one of said brakes including a member attached to said oscillatory element substantially in vertical alinement with said shaft when said element is in brake-released position, said member being movable transversely of the shaft in the movement of said element in one direction away from brake-released position.

11. A power brake having, in combination with the rear wheels and the propeller shaft of an automotive vehicle, brakes for said wheels, a friction element mounted for oscillation about the axis of said shaft, a driving friction element rotatable with said shaft, means operable to cause gripping engagement of said elements, and means operable from said oscillatory element to apply both of said brakes in the movement of the element away from brake-released position, said operating means including two members attached to said oscillatory element above and below said shaft so as to move transversely of said shaft and in opposite directions in the application of said brakes.

In testimony whereof, I have hereunto affixed my signature.

ADDI BENJAMIN CADMAN.